Nov. 4, 1958 J. H. KARCHMER ET AL 2,859,090
TREATMENT OF FLUIDS FOR REMOVAL OF HYDROGEN CYANIDE
Filed Feb. 7, 1955
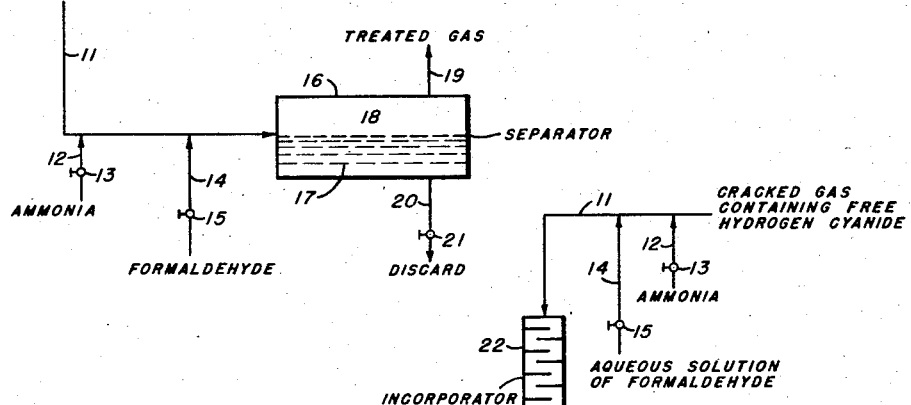
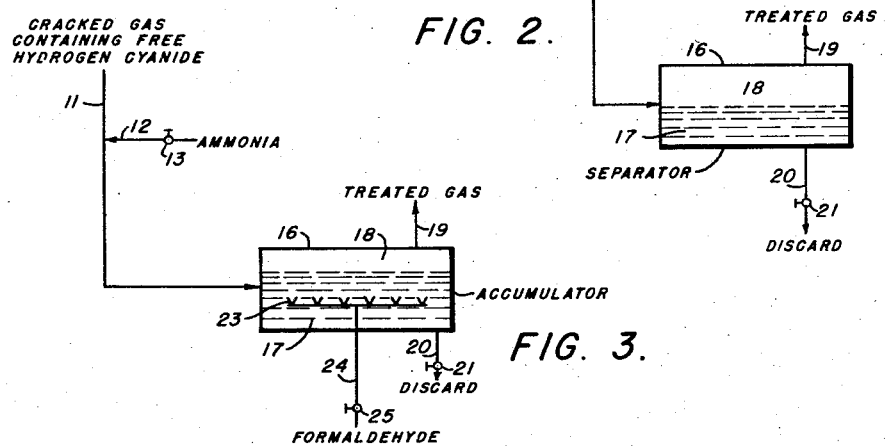
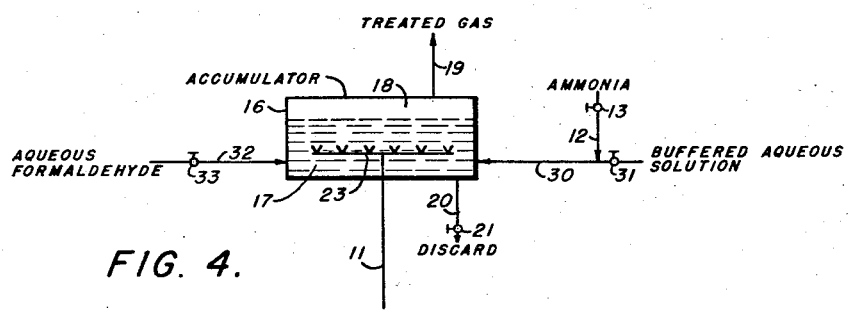
INVENTORS.
Jean H. Karchmer,
Marjorie T. Walker,
BY
ATTORNEY.

United States Patent Office 2,859,090
Patented Nov. 4, 1958

2,859,090
TREATMENT OF FLUIDS FOR REMOVAL OF HYDROGEN CYANIDE

Jean H. Karchmer, Houston, and Marjorie T. Walker, Baytown, Tex., assignors, by mesne assignments, to Esso Research and Engineering Company, Elizabeth, N. J., a corporation of Delaware Application February 7, 1955, Serial No. 486,357

12 Claims. (Cl. 23—2)

The present invention is directed to a method for treatment of fluids for removal of hydrogen cyanide. More particularly, the invention is directed to the treatment of product streams from catalytic cracking of hydrocarbons for removal of hydrogen cyanide. In its more specific aspects, the invention is directed to treatment of gaseous streams from catalytic cracking operations for removal of hydrogen cyanide.

The present invention may be briefly described as a method for treating fluids containing hydrogen cyanide which comprises contacting the hydrogen cyanide-containing fluid with an aqueous solution of a water soluble aldehyde having a pH in the range from 7 to about 12. Specifically, the present invention comprises treating hydrocarbon gases and the like which contain hydrogen cyanide by contacting the gases with an aldehyde under basic conditions such that the cyanide reacts with the aldehyde to convert same to a hydroxy nitrile.

In the catalytic cracking of hydrocarbons, the catalytically cracked products, such as gases, frequently contain hydrogen cyanide and ammonia among the other cracked products. This is especially true when the hydrocarbons which are cracked are obtained from nitrogen-containing cracking stocks such as those from the Gulf Coast and the California fields. Hydrogen cyanide causes considerable difficulty in refining equipment due to hydrogen blistering of ferrous metal equipment and other forms of corrosion. Hydrogen cyanide is a very reactive chemical and may be treated with a number of oxidizing agents to remove and/or convert the hydrogen cyanide to a non-corrosive form. However, large amounts of hydrogen sulfide are usually present in cracked products. This hydrogen sulfide in the presence of ammonia, either naturally present or added to the cracked products, is converted to ammonium sulfide and any oxidizing agent which may be used to remove and/or react with the cyanide must first oxidize all of the sulfide ion before the cyanide can be reacted.

It has now been found that an aldehyde, such as formaldehyde, will react with free cyanide ion in the presence of large amounts of sulfide ion and completely remove the cyanide without appreciably lowering the sulfide content of the cracked product. This reaction is carried out in a basic medium. For example, the basicity in the cracked product is provided by ammonia in the cracked gases either naturally present or added to combat corrosion. The equation for the reaction is as follows:

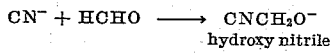

$$CN^- + HCHO \longrightarrow CNCH_2O^-$$
hydroxy nitrile

The hydroxy nitrile exists as an anion in an alkaline solution, see Kolthoff, I. M., Stenger, V. A., Volumetric Analysis, vol. II, page 267, Interscience Publishers, New York. Formaldehyde specifically removes the cyanide by the aforementioned reaction and is economically desirable since the actual cyanide concentration causing corrosion difficulties is relatively low and the amount of aldehyde required to react with the cyanide is relatively small and therefore inexpensive.

The basicity of the aqueous solution or medium for the reaction is in the range from a pH of 7 to about 12 with a preferred pH of about 9. The pH of the aqueous medium in gaseous streams varies from about 7.8 to about 9 and the pH of the solution is preferably in this range. The amount of aldehyde employed should range from a mole ratio of aldehyde to cyanide ion from about 1:1 to about 12:1 with best results obtained with a mole ratio of aldehyde to cyanide of 2:1.

The aldehydes employed in the practice of the present invention are formaldehyde, acetaldehyde, furfuraldehyde, propionaldehyde, and acrolein. Specifically, it is contemplated to use the water soluble aldehydes and some of the butyraldehydes may also be employed. Formaldehyde is preferable and may be injected into the gaseous stream which contains moisture and hydrogen sulfide as a gas or it may be injected as an aqueous solution. The formaldehyde may also be injected into the accumulator or separator waters as a gas.

The invention will be further illustrated by reference to the drawing in which:

Fig. 1 shows the injection of formaldehyde into a gaseous stream containing free hydrogen cyanide and hydrogen sulfide;

Fig. 2 shows another mode of practicing the invention where an aqueous solution of formaldehyde is employed;

Fig. 3 illustrates a further modification of the present invention employing gaseous formaldehyde; and Fig. 4 is an illustration of the use of a buffered aqueous solution having a pH from 8 to about 9.5.

Referring now to the drawing, numeral 11 designates a charge line in which a cracked gas containing free hydrogen cyanide and hydrogen sulfide is introduced into the system from a cracking unit, such as a catalytic cracking operation of the fluidized powder or solids type. The gas in line 11 as it flows therethrough may have ammonia introduced thereby by way of line 12 controlled by valve 13 and downstream from the ammonia injection, if practiced, formaldehyde is introduced through line 14 controlled by valve 15. The gas in line 11 contains moisture which may have a pH in the range from about 7.8 to about 9, either due to naturally present or injected ammonia. In separator 16 the moisture separates out as an aqueous phase 17 from the gaseous phase 18. The injection of the formaldehyde in line 11 causes reaction with the hydrogen cyanide without appreciable reaction with the ammonium sulfide. The treated gas substantially free of hydrogen cyanide leaves separator 16 by way of line 19 while the aqueous phase 17 is withdrawn for further use as desired or discarded through line 20 controlled by valve 21.

In Fig. 2, a cracked gas from a catalytic cracking operation, such as has been described, is introduced into the system through line 11 and has ammonia added thereto, if necessary, by way of line 12 controlled by valve 13 following which an aqueous solution of formaldehyde is introduced by line 14 controlled by valve 15. This aqueous solution of formaldehyde may have its pH adjusted in the range indicated. The gas into which the aqueous solution of formaldehyde is injected passes by way of line 11 into an incorporator or other suitable mixing device, such as 22, and then it is introduced into separator 16 where the aqueous phase 17 separates from the gas phase 18. Like in Fig. 1, the treated gas is removed by line 19 while the solution or aqueous phase is discarded by line 20.

In the embodiment of Fig. 3, the cracked gas from the catalytic cracking operation is introduced into the system by line 11 and may have ammonia introduced thereinto by line 12 controlled by valve 13.

The gas to which ammonia has been added contains moisture and the aqueous phase 17 settles out in the accumulator 16 from the gaseous phase 18. Arranged in the accumulator 16 is a spider 23 which is connected by way of line 24 controlled by valve 25 to a source of gaseous formaldehyde. The formaldehyde introduced into the aqueous phase 17 reacts with the hydrogen cyanide therein to form the nitrile.

The treated gases are removed from the separator or accumulator 16 by line 19 while the aqueous phase 17 is discarded by line 20 controlled by valve 21.

In another mode of practicing the invention, as illustrated in Fig. 4, cracked gas containing hydrogen cyanide, hydrogen sulfide, and ammonia is introduced into the mixing vessel 16 by line 11 where it is admixed by means of spider 23 with a buffered aqueous solution introduced through line 30 controlled by valve 31. The pH of this solution may be adjusted by addition of ammonia through line 12 controlled by valve 13. The formaldehyde is introduced into the aqueous phase 17 by means of line 32 controlled by valve 33. The formaldehyde may be in the aqueous phase or it may be in the form of a pure gas. The treated gas is removed by means of line 19 and the spent treating solution is discarded by means of line 20 controlled by valve 21.

In order to illustrate the present invention, an aqueous sample containing 0.515 mg. of sulfide ion and 0.969 mgm. of cyanide ion after the injection of an excess of formaldehyde was found to contain no cyanide. The analysis showed the sulfide content to be 0.430 mg. These data show that the cyanide ion is reacted selectively without appreciable reaction or lowering of the sulfide. In additional operations on aqueous solutions separated from gaseous streams, it was found that at a pH of 10.9 effective cyanide removal could be obtained at the mole ratio of 4 moles of formaldehyde to 1 mole of cyanide. At this pH the sulfide concentration is not affected.

Table I, which follows, illustrates the effect of formaldehyde concentration at a constant pH of 10.9.

TABLE I

*Effect of formaldehyde concentration*

[pH 10.9.]

| Mole Ratio CH$_2$O:CN | Percent Removal | |
|---|---|---|
| | (CN)$^-$ | (S)$^-$ |
| 1:1 | 76.6 | 2.2 |
| 2:1 | 85.9 | 4.3 |
| 4:1 | 96.6 | −3.0 |
| 6:1 | 97.6 | −3.0 |
| 325:1 | 100.0 | 14.3 |

It will be seen from these data that at a ratio of formaldehyde to cyanide of 4:1 that 96.6% of cyanide was removed with little, if any, effect on the sulfide ion.

Solutions having a mole ratio of formaldehyde to cyanide of 1:1 of various pH values were tried and it was found that the optimum pH of the solution for the reaction of formaldehyde and cyanide to proceed was at about 9. At pH values above and below this value, the removal of cyanide is not as great as at a pH of 9.

In Table II, which follows, the effect of pH variation of the solution at a molecular ratio of aldehyde to cyanide of 1:1 is illustrated.

TABLE II

*Effect of pH variation*

[Mole ratio CN$^-$:CH$_2$O=1:1.]

| pH | Percent Removal | |
|---|---|---|
| | (CN)$^-$ | (S)$^-$ |
| 8.1 | 87.9 | |
| 9.0 | 94.5 | 6.6 |
| 9.5 | 92.5 | 2.0 |
| 10.9 | 76.0 | 2.2 |
| 12.5 | 54.0 | 2.0 |

It will be noted from these data that greatest removal of cyanide is effected at a pH of about 9 as indicated supra with very little sulfide removal.

In order to illustrate the invention further, plant streams containing both cyanide and sulfides which were separated from the gaseous phase were treated with formaldehyde using different mol ratios. The results of these treatments are presented in Table II which follows:

TABLE III

*Treatment of plant samples with formaldehyde*

[pH 8.1.]

| Mole Ratio CH$_2$O:(CN)$^-$ | Percent Removal | | Comments |
|---|---|---|---|
| | (CN)$^-$ | (S)$^-$ | |
| 1:1 | 75.0 | 19.5 | Clear. |
| 2:1 | 83.8 | 33.8 | Yellow ppt. formed. |
| 6:1 | 79.7 | 35.7 | Yellow ppt. formed. |
| 12:1 | 83.7 | 63.0 | Yellow ppt. and a greenish blue ppt. formed. |

It may be seen from the data in Table III that, at a mol ratio of 1:1, 75 percent of the cyanide was removed and only 20% of the sulfide was lost. When higher ratios of formaldehyde to cyanide were employed, the cyanide removal was greater but the incremental removal was small compared with the amount of formaldehyde used. At all ratios above the 1:1 level, a precipitate formed indicating a reaction of the formaldehyde with sulfides or other materials present in the accumulator waters.

Significant removal of the cyanide ion may be achieved by injection of one mole of formaldehyde per mole of free cyanide tinto the accumulator waters. It is more advantageous, however, to prepare a special scrubbing solution buffered to a pH of about 9. Gaseous or aqueous formaldehyde may be then injected upstream to the hydrogen cyanide-containing gas. This system provides an optimum pH for the removal of the hydrogen cyanide, means for keeping the formaldehyde-cyanide ratio at a constant ratio of 1:1, and avoids condensation of the formaldehyde such as may occur if introduced directly into a basic solution.

The present invention is of considerable utility in that it effectively prevents hydrogen blistering and allows selective removal of hydrogen cyanide even in the presence of sulfides without reaction with the sulfides.

The invention is useful in the modern petroleum refinery and may be useful wherever hydrogen cyanide is present in products in contact with ferrous metal equipment in preventing corrosion thereof.

The nature and objects of the present invention having been completely described and illustrated, what we wish to claim as new and useful and to secure by Letters Patent is:

1. A method for removing a major portion of hydrogen cyanide and only a minor portion of hydrogen sulphide from catalytically cracked fluids containing hydrogen cyanide, hydrogen sulphide, ammonia and moisture comprising reacting said fluids with a water soluble aliphatic aldehyde, the mol ratio of the aldehyde ion to the cyanide ion being in the range of about 1:1 to about 6:1 to form a cyanide-aldehyde reaction product, said reaction medium having a pH in the range of about 8 to about 11.

2. A method as recited in claim 1 wherein the aldehyde is formaldehyde.

3. A method as recited in claim 1 wherein the aldehyde is acetaldehyde.

4. A method as recited in claim 1 wherein the aldehyde is propionaldehyde.

5. A method as recited in claim 1 wherein the aldehyde is furfuraldehyde.

6. A method as recited in claim 1 wherein the aldehyde is acrolein.

7. A method for removing at least 75 percent of hydrogen cyanide and less than 7 percent of hydrogen sulphide from catalytically cracked fluids containing hydrogen cyanide, hydrogen sulphide, ammonia and moisture comprising reacting said fluids with a water soluble aliphatic aldehyde, the mol ratio of the aldehyde ion to the cyanide ion being in the range of about 1:1 to form a cyanide-aldehyde reaction product, said reaction medium having a pH in the range from about 8 to about 11.

8. A method as recited in claim 7 wherein the aldehyde is formaldehyde.

9. A method as recited in claim 7 wherein the aldehyde is acetaldehyde.

10. A method as recited in claim 7 wherein the aldehyde is propionaldehyde.

11. A method as recited in claim 7 wherein the aldehyde is furfuraldehyde.

12. A method as recited in claim 7 wherein the aldehyde is acrolein.

References Cited in the file of this patent

UNITED STATES PATENTS

| 2,086,731 | Millar et al. | July 13, 1937 |
| 2,086,732 | Millar et al. | July 13, 1937 |

FOREIGN PATENTS

| 439,974 | Great Britain | Dec. 18, 1935 |

OTHER REFERENCES

Walker: "Formaldehyde," pages 46–49, 86–87 and 185–187, 2nd ed., 1953, American Chemical Society Monograph Series, No. 120, Reinhold Publishing Co., New York, N. Y.

Menaul and Dunn: "Formaldehyde as an Inhibitor of Corrosion Caused by Hydrogen Sulphide," Petroleum Technology, vol. 9, January 1946, Technical Publication 1970.